United States Patent
Kaltenbach et al.

(10) Patent No.: US 8,257,223 B2
(45) Date of Patent: Sep. 4, 2012

(54) METHOD FOR CARRYING OUT A SHIFT DURING HYBRID OPERATION IN A PARALLEL HYBRID VEHICLE

(75) Inventors: Johannes Kaltenbach, Friedrichshafen (DE); Stefan Wallner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 346 days.

(21) Appl. No.: 12/671,140

(22) PCT Filed: Aug. 8, 2008

(86) PCT No.: PCT/EP2008/060441
§ 371 (c)(1),
(2), (4) Date: Jan. 28, 2010

(87) PCT Pub. No.: WO2009/021914
PCT Pub. Date: Feb. 19, 2009

(65) Prior Publication Data
US 2011/0172055 A1    Jul. 14, 2011

(30) Foreign Application Priority Data

Aug. 16, 2007  (DE) .......................... 10 2007 038 772

(51) Int. Cl.
*B60W 10/02* (2006.01)
*B60W 10/06* (2006.01)
*B60W 10/08* (2006.01)
*B60W 10/10* (2006.01)

(52) U.S. Cl. ............................... 477/5; 477/77; 903/930

(58) Field of Classification Search ................ 477/5, 77, 477/167; 903/930
See application file for complete search history.

(56) References Cited

U.S. PATENT DOCUMENTS

| 4,021,712 A | 5/1977 | Ishihara et al. |
| 5,735,770 A * | 4/1998 | Omote et al. ..................... 477/5 |
| 5,890,392 A | 4/1999 | Ludanek et al. |
| 6,059,059 A | 5/2000 | Schmidt-Brucken |
| 6,077,186 A | 6/2000 | Kojima et al. |
| 6,166,512 A | 12/2000 | Kojima |
| 6,176,807 B1 | 1/2001 | Oba et al. |
| 6,319,168 B1 | 11/2001 | Morris et al. |
| 6,504,259 B1 | 1/2003 | Kuroda et al. |
| 6,505,109 B1 | 1/2003 | Strandell et al. |
| 6,506,139 B2 | 1/2003 | Hirt et al. |
| 6,524,219 B2 | 2/2003 | Mesiti et al. |
| 6,543,561 B1 | 4/2003 | Pels et al. |
| 6,574,535 B1 | 6/2003 | Morris et al. |
| 6,871,734 B2 | 3/2005 | Kupper et al. |
| 6,887,184 B2 | 5/2005 | Buchanan et al. |
| 6,938,713 B1 | 9/2005 | Tahara et al. |
| 7,395,837 B2 | 7/2008 | Foster et al. |
| 7,464,616 B2 | 12/2008 | Leibbrandt et al. |

(Continued)

FOREIGN PATENT DOCUMENTS

DE    44 36 914 A1    5/1996
(Continued)

*Primary Examiner* — Edwin A Young
(74) *Attorney, Agent, or Firm* — Davis & Bujold, P.L.L.C.

(57) ABSTRACT

A method of carrying out a shift with traction force interruption during hybrid operation in a parallel hybrid vehicle having an automated transmission. The method comprises the steps of maintaining the coupling between the internal combustion engine (1) and the electric machine (2), eliminating the load before disengaging the old gear, and synchronizing to the new gear by the operation of the electric machine (2).

7 Claims, 1 Drawing Sheet

U.S. PATENT DOCUMENTS

| | | |
|---|---|---|
| 7,500,932 B2 | 3/2009 | Katakura et al. |
| 2003/0010548 A1 | 1/2003 | Mesiti et al. |
| 2005/0088123 A1 | 4/2005 | Wakitani et al. |
| 2005/0164827 A1 | 7/2005 | Beaty et al. |
| 2005/0209047 A1 | 9/2005 | Berger et al. |
| 2005/0221947 A1 | 10/2005 | Mesiti et al. |
| 2006/0113858 A1 | 6/2006 | Hino et al. |
| 2006/0199696 A1 | 9/2006 | Gouda et al. |
| 2007/0056783 A1 | 3/2007 | Joe et al. |
| 2007/0095584 A1 | 5/2007 | Roske et al. |
| 2007/0102211 A1 | 5/2007 | Nozaki et al. |
| 2007/0114081 A1 | 5/2007 | Iwanaka et al. |
| 2008/0036322 A1 | 2/2008 | Franke |
| 2008/0245332 A1 | 10/2008 | Rimaux et al. |
| 2009/0051309 A1 | 2/2009 | Rehm et al. |
| 2009/0146615 A1 | 6/2009 | Zillmer et al. |
| 2009/0223727 A1 | 9/2009 | Tolksdorf |

FOREIGN PATENT DOCUMENTS

| | | |
|---|---|---|
| DE | 196 31 983 C1 | 2/1998 |
| DE | 197 09 457 A1 | 9/1998 |
| DE | 198 14 402 A1 | 10/1999 |
| DE | 199 45 473 A1 | 4/2000 |
| DE | 199 39 334 A1 | 3/2001 |
| DE | 101 26 346 A1 | 1/2002 |
| DE | 101 26 348 A1 | 1/2002 |
| DE | 103 40 529 A1 | 3/2004 |
| DE | 103 27 306 A1 | 1/2005 |
| DE | 10 2004 022 767 A1 | 7/2005 |
| DE | 600 22 593 T2 | 2/2006 |
| DE | 698 31 468 T2 | 6/2006 |
| DE | 10 2005 016 117 A1 | 7/2006 |
| DE | 10 2005 007 966 A1 | 10/2006 |
| DE | 10 2005 015 657 A1 | 10/2006 |
| DE | 10 2006 019 679 A1 | 11/2006 |
| DE | 1 2005 057 607 B3 | 4/2007 |
| DE | 10 2005 051 382 A1 | 5/2007 |
| DE | 11 2006 001 985 T5 | 5/2008 |
| EP | 1 167 834 A1 | 1/2002 |
| EP | 1 177 930 A2 | 2/2002 |
| EP | 1 219 493 A1 | 7/2002 |
| EP | 13 19 546 A1 | 6/2003 |
| EP | 1 450 074 A2 | 8/2004 |
| EP | 1 468 865 A2 | 10/2004 |
| EP | 14 68 865 A2 | 10/2004 |
| EP | 1 527 927 A1 | 5/2005 |
| EP | 1 714 817 A1 | 10/2005 |
| EP | 1 255 656 B1 | 3/2006 |
| EP | 1 774 083 A2 | 1/2007 |
| EP | 1 762 417 A1 | 3/2007 |
| EP | 1 785 305 A2 | 5/2007 |
| FR | 2 722 738 A1 | 1/1996 |
| FR | 2 796 437 A1 | 1/2001 |
| FR | 2 892 471 A1 | 4/2007 |
| WO | 00/03 163 A1 | 1/2000 |
| WO | 00/03163 A1 | 1/2000 |
| WO | 02/086343 | 10/2002 |
| WO | 03/066367 A1 | 8/2003 |
| WO | 2004/111441 A1 | 12/2004 |
| WO | 2006/020476 A2 | 2/2006 |
| WO | 2006/053624 A1 | 5/2006 |

\* cited by examiner

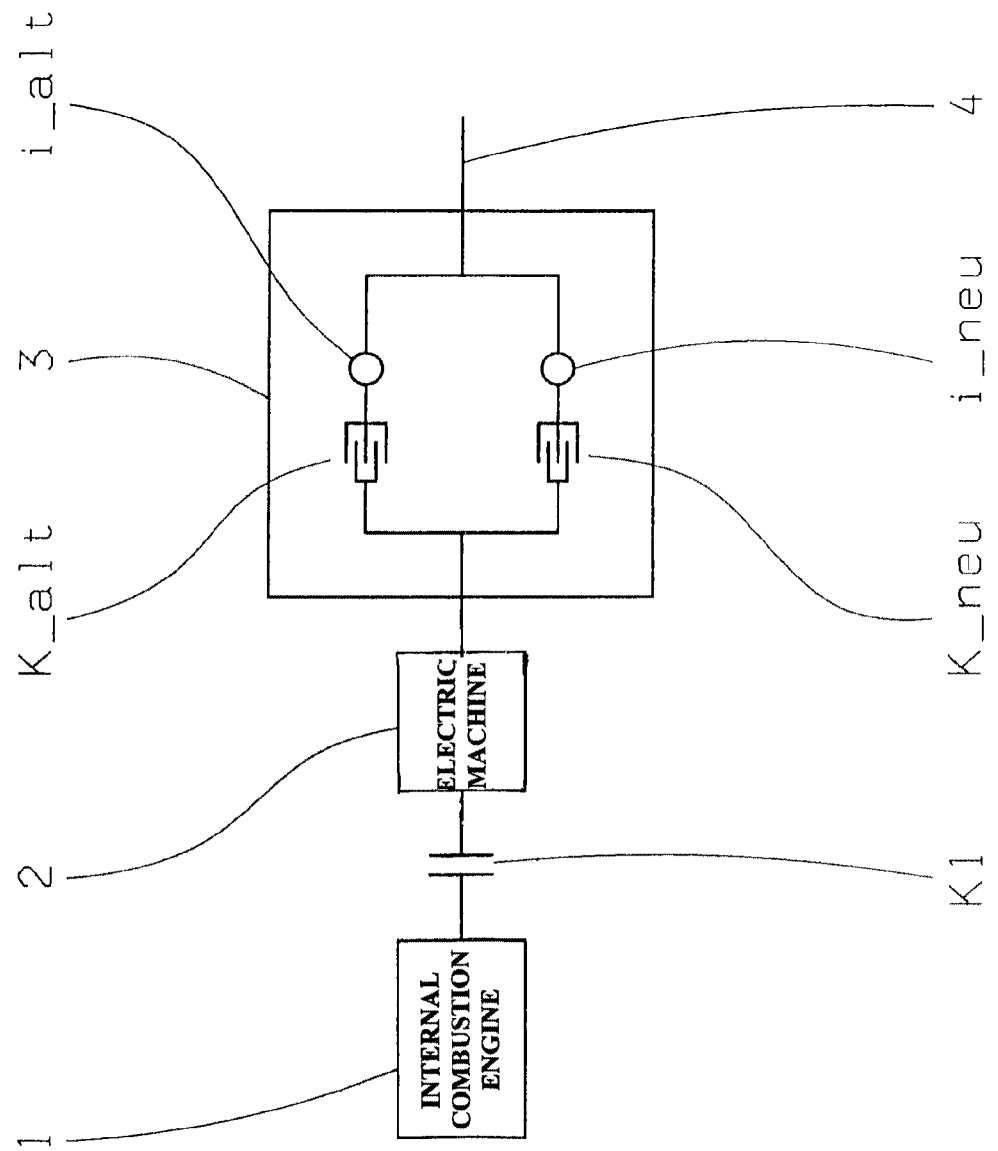

METHOD FOR CARRYING OUT A SHIFT DURING HYBRID OPERATION IN A PARALLEL HYBRID VEHICLE

This application is a National Stage completion of PCT/EP2008/060441 filed Aug. 8, 2008, which claims priority from German patent application no. 10 2007 038 772.7 filed Aug. 16, 2007.

FIELD OF THE INVENTION

The present invention relates to a method for carrying out a shift with traction force interruption during hybrid operation in a parallel hybrid vehicle comprising an automated transmission.

BACKGROUND OF THE INVENTION

From the prior art, hybrid vehicles comprising a hybrid drive are known. Besides the internal combustion engine they comprise at least one electric motor or electric machine. In serial hybrid vehicles a generator supplies electrical energy to the electric motor that drives the wheels. In addition parallel hybrid vehicles are known, in which the torques of the internal combustion engine and of at least one electric machine that can be connected to the internal combustion engine are added. In this case the electric machines can be connected to the belt drive or to the crankshaft of the internal combustion engine. The torques produced by the internal combustion engine and/or the at least one electric machine are transmitted to the driven axle by a downstream transmission.

For example, from DE 102006019679 A1 a drivetrain with an electrically controllable hybrid drive and an electro-hydraulic control system, a number of electric power units and a number of torque transmission mechanisms is known. In this case the torque transmission mechanisms can be selectively engaged by the electro-hydraulic control system to produce four forward gears, a neutral condition, an electric operating mode with low and high rotation speeds, an electrically adjustable operating mode with low and high rotation speeds, and an uphill operating mode.

From DE 102005057607 B3 a hybrid drive for vehicles is known, which comprises at least a main motor, in particular an internal combustion engine, a generator, an electric motor and a planetary transmission comprising a sun gear, a ring gear, a planetary gear carrier and planetary gearwheels, which has at least one drive output shaft. In this case it is provided that for a first driving range of the vehicle, in order to add the torques, the driveshafts of the main motor and of the electric motor are coupled to the sun gear of the planetary transmission, and for a further driving range one of the two motors can be coupled by frictional means to the ring gear of the planetary transmission for the mechanical addition of the rotation speeds in accordance with the superimposition principle.

In vehicles comprising an automated transmission, the transmission input must be free from load before a gear can be disengaged; furthermore, before the new gear can be engaged the transmission input must be synchronized.

According to the prior art a shift with traction force interruption is carried out in hybrid vehicles with an automated transmission during hybrid operation by eliminating the load at the internal combustion engine and the electric machine in a first step, and then decoupling the internal combustion engine from the drivetrain by disengaging a clutch. When the internal combustion engine has been decoupled the old gear is disengaged and the speed of the electric machine is adjusted to the synchronous speed, the new gear is then engaged, the internal combustion engine is re-coupled, and finally the load at the internal combustion engine and the electric machine is built up again.

SUMMARY OF THE INVENTION

The purpose of the present invention is to indicate a method for carrying out a shift with traction force interruption during hybrid operation in a parallel hybrid vehicle comprising an automated transmission, by the application of which a more rapid shift sequence is achieved compared with the prior art. In addition the application of the method should reduce exhaust gas emissions, fuel consumption and the generation of noise.

According to the claims, a method is proposed for carrying out a shift with traction force interruption during hybrid operation in parallel hybrid vehicles comprising an automated transmission, in which the internal combustion engine and the electric machine remain coupled to one another and the load elimination before disengaging the old gear and synchronizing to the new gear are effected by operating the electric machine.

According to the invention, the load elimination takes place by virtue of a load compensation with the help of the electric machine in such manner that the electric machine compensates for the torque of the internal combustion engine, whereby the transmission input shaft is rendered free from load. During this load compensation the internal combustion engine is operated with constant torque. But if the torque of the internal combustion engine exceeds a threshold value (such that beyond the threshold value the electric machine would be overloaded) or if the energy accumulator of the vehicle would be overcharged due to the load compensation by the electric machine, the torque of the internal combustion engine is reduced.

Once load elimination has taken place, the old gear is disengaged and synchronization is then carried out by adjusting the speed of the electric machine to the connection or synchronization speed of the new gear. According to an advantageous further development of the invention this speed adaptation takes place in a speed regulation mode of the electric machine in which the torque of the internal combustion engine serves as a pilot torque for the speed regulator of the electric machine.

Once synchronization has taken place the new gear is engaged and then, in the case when speed adaptation was carried out in the speed regulation mode, the electric machine is changed back to a torque-controlled mode and the load is built up in accordance with the torque desired by the driver. During this, the electric machine and the internal combustion engine are adjusted to torques preferably determined by a separate torque distribution strategy for the electric machine and the internal combustion engine.

During a shift it is advantageous for operation of the electric machine as a generator to be possible to ensure that ancillary electric consumers continue to be supplied; in addition the vehicle's energy accumulator can be charged without interruption and therefore more rapidly.

In that the internal combustion engine is predominantly operated at constant torque or with only slow torque variation (if necessary), an advantage obtained is that exhaust emissions decrease and at the same time both fuel consumption and the generation of noise are reduced. A further advantage of the method according to the invention is that a rapid shift sequence can be achieved since the clutch connecting the internal combustion engine releasably to the electric machine need not be actuated.

BRIEF DESCRIPTION OF THE DRAWING

Below, an example of the invention is explained in more detail with reference to the attached FIGURE, which shows as an example a diagrammatic and simplified representation of the drivetrain of a parallel hybrid vehicle comprising an automated transmission.

DETAILED DESCRIPTION OF THE PREFERRED EMBODIMENTS

As shown in FIG. 1, the drivetrain of a parallel hybrid vehicle with an automated transmission comprises an internal combustion engine 1 and at least one electric machine 2, arranged in that order one after the other, such that the internal combustion engine 1 can be decoupled from the electric machine 2 and thus from the drivetrain by opening a clutch K1.

After the electric machine 2 in the force flow direction is arranged an automated transmission, which in the example representation is shown to illustrate the method according to the invention, comprises a claw clutch K_neu to be engaged for the new gear to be engaged and a claw clutch K_alt to be disengaged in order to disengage the old gear, such that each clutch K_neu and K_alt or each gear is associated with a transmission ratio step having respective transmission ratios i_neu and i_alt. In the FIGURE the drive output of the automated transmission is indexed 4.

According to the invention, a method for carrying out a shift with traction force interruption during hybrid operation in a parallel hybrid vehicle with an automated transmission is proposed, in which, in contrast to the methods known from the prior art, the internal combustion engine 1 and the electric machine 2 remain coupled to one another by the engaged clutch K1 so that the load elimination before the old gear can be disengaged and the synchronization are effected by operating the electric machine 2.

In this case the necessary load elimination takes place by virtue of a load compensation with the help of the electric machine 2 in which the electric machine 2 compensates for the torque of the internal combustion engine 1, whereby the transmission input shaft is rendered free from torque. During the load compensation the internal combustion engine 1 is preferably operated at constant torque; according to the invention, action upon the torque takes place only if the torque exceeds a threshold value or when the vehicle's energy accumulator would become overcharged due to the load compensation by the electric machine 2.

When the load has been removed the old gear is disengaged by disengaging the claw clutch K_alt and synchronization to the new gear is carried out by adjusting the speed of the electric machine 2 to the connection or synchronous speed of the new gear. This speed adaptation preferably takes place when the electric machine 2 has been changed from the torque-controlled mode to a speed regulation mode, with the torque of the internal combustion engine serving as the pilot torque for the speed regulator of the electric machine.

After synchronization, the new gear is engaged by engaging the claw clutch K_neu, the electric machine is then changed back to the torque-controlled mode and the load is built up in accordance with the torque desired by the driver.

INDEXES

1 Internal combustion engine
2 Electric machine
3 Automated manual-speed transmission
4 Drive output
K1 Clutch
K_neu Claw clutch
K_alt Claw clutch
i_neu Transmission ratio
i_alt Transmission ratio

The invention claimed is:

1. A method of carrying out a shift with traction force interruption during hybrid operation in a parallel hybrid vehicle having an automated transmission and a single electric machine connected between an internal combustion engine and an input shaft of the automated transmission, the method comprising the steps of:
   maintaining a coupling between the internal combustion engine (1) and the electric machine (2);
   one of (a) operating the internal combustion engine at a constant torque and (b) adjusting a torque from the internal combustion engine when the torque from the internal combustion engine exceeds a threshold value, and
   operating the electric machine to compensate for torque from the internal combustion engine to eliminate a load on the input shaft of the automated transmission; and
   disengaging an old transmission gear and synchronizing to a new transmission gear.

2. The method of carrying out a shift with traction force interruption according to claim 1, further comprising the step of:
   adjusting the torque from the internal combustion engine (1), or when an energy accumulator of the vehicle would become overcharged due to the torque compensation by the electric machine (2).

3. The method of carrying out a shift with traction force interruption, according to claim 1, further comprising the step of disengaging the old transmission gear, after the load on the input shaft of the automated transmission is eliminated, and then synchronizing the new transmission gear by adjusting a speed of the electric machine (2) to a synchronous speed of the new transmission gear.

4. The method of carrying out a shift with traction force interruption, according to claim 3, further comprising the step of adjusting the speed of the electric machine (2) by switching the electric machine (2) from a torque-controlled mode to a speed regulation mode in which the speed of the electric machine (2) is adjusted, with the torque from the internal combustion engine being a pilot torque for a speed regulator of the electric machine (2).

5. The method of carrying out a shift with traction force interruption, according to claim 4, further comprising the step of engaging the new transmission gear after the synchronization to the new transmission gear; and
   increasing the load on the input shaft of the automated transmission, according to a torque which is desired by the driver, and returning the electric machine to the torque-controlled mode for increasing the load build-up on the input shaft of the automated transmission, when the speed of the electric motor was adjusted to the synchronous speed of the new transmission gear in the speed regulation mode.

6. The method of carrying out a shift with traction force interruption, according to claim 5, comprising the step of adjusting the electric machine (2) and the internal combustion engine (1) to torques determined by a separate torque distribution strategy for the load build-up on the input shaft of the automated transmission.

7. The method of carrying out a shift with traction force interruption, according to claim 1, further comprising the step of operating the electric machine as a generator during a shift.

* * * * *